June 5, 1928.
W. C. WILLIAMS
VENTILATOR
Filed May 4, 1926
1,672,291
2 Sheets-Sheet 1
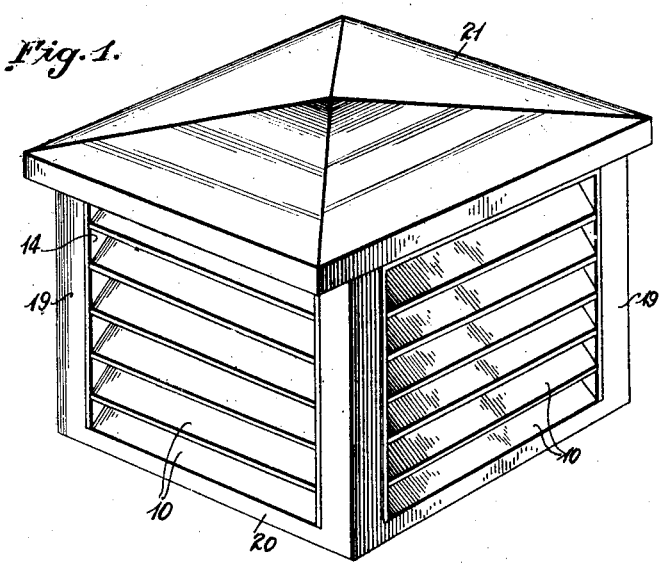
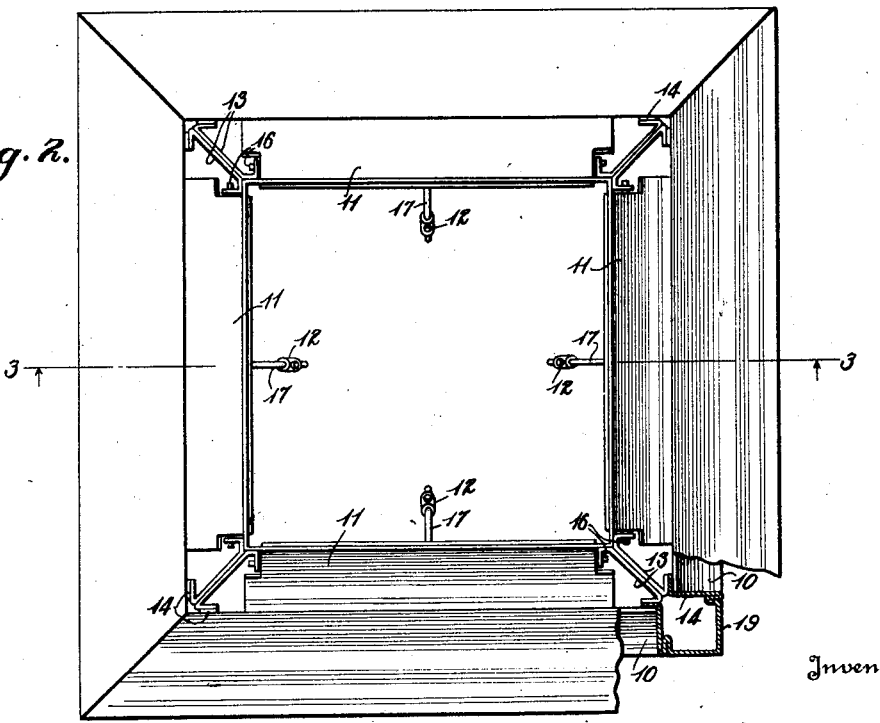

June 5, 1928. 1,672,291
W. C. WILLIAMS
VENTILATOR
Filed May 4, 1926 2 Sheets-Sheet 2

Inventor
Walter C. Williams
By
His Attorney

Patented June 5, 1928.

1,672,291

UNITED STATES PATENT OFFICE.

WALTER C. WILLIAMS, OF WILKES-BARRE, PENNSYLVANIA.

VENTILATOR.

Application filed May 4, 1926. Serial No. 106,683.

This invention relates to improvements in ventilators, principally of that type which are adapted to be mounted at the top of an air stack or shaft, the primary object being to provide a ventilator which will prevent back drafts or down drafts regardless of the direction of the wind.

More specifically the invention consists in providing a ventilator whose parts may be cheaply produced, and may be prepared for shipment in partially assembled condition so that their complete assembly on a building is greatly facilitated. In the present ventilator there are a plurality of series of movable louvers, each series facing in a different direction, so that one set or more of said series can be closed by the wind depending upon the direction of the wind. The series or sets of louvers to be closed are, of course, to the windward side of the stack, said louvers being closed by the wind itself and the present invention seeks to provide means for insuring the louvers being closed, such means preferably consisting of a series of fixed louvers so arranged with respect to the movable louvers as to direct the wind against the faces of the pivoted louvers whereby the full force of the wind will be exerted against the movable louvers to close them.

A further object is to so arrange the pivoted or movable louvers as to facilitate their assembly in the ventilator, this feature of the invention consisting in having each series of movable louvers carried by a frame that is removably secured in the casing of the ventilator. Another object consists in mounting the pivoted louvers in such wise as to permit their shafts to have a rolling line contact whereby they will be capable of being closed by very little pressure caused by the wind.

Not infrequently, in driving rain storms, water is driven between the louvers and will find its way down the stack but in the present case provision is made for trapping such rain water and diverting it from the interior of the ventilator to a point at the exterior thereof. Normally, of course, the louvers are maintained in an open position so as to permit the exit of air arising up the stack, the louvers being maintained in normal position by a counterbalance and in this connection the invention also seeks to provide a counterbalance that may be adjusted on the pivoted louvers in such wise as to regulate the pressure which must be exerted to move them to their closed position.

With these and other objects in view the invention consists in certain novel details of construction and combination and arrangement of parts, all as will hereinafter be more fully described and the novel features thereof particularly pointed out in the appended claims.

In the accompanying drawings:

Figure 1 is a perspective view of the preferred construction of ventilator embodying the present improvements;

Fig. 2 is a top plan view of the ventilator with its cover removed;

Figure 3:
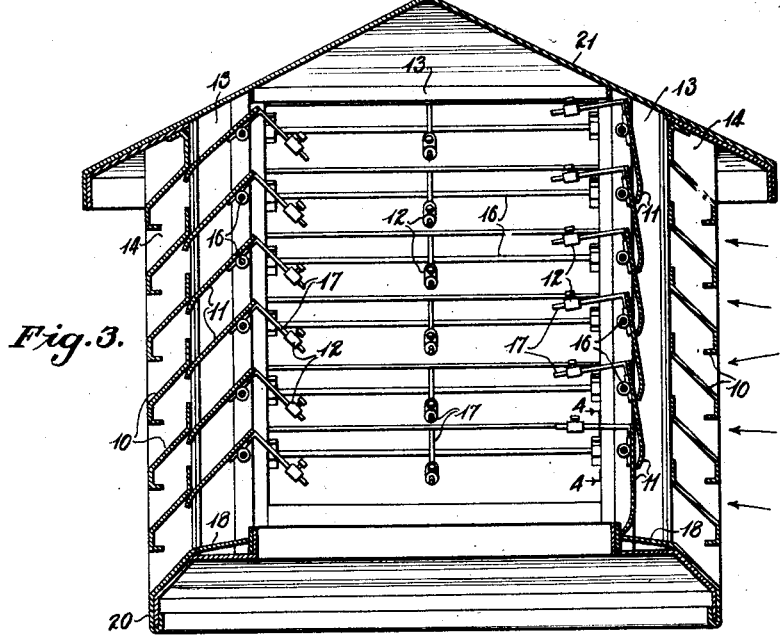
Fig. 3 is a sectional view taken on the line 3—3 of Fig. 2.
Figure 5:
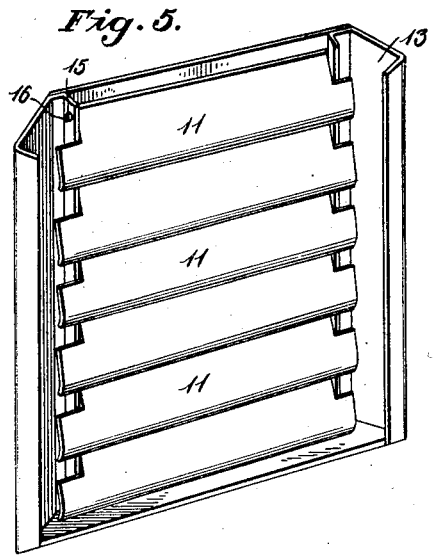
Fig. 5 is a detail view of one of the frames detached from the ventilator casing.
Figure 4:
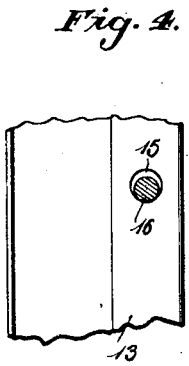
Fig. 4 is a sectional view taken on the line 4—4 of Fig. 3.

In the preferred construction the ventilator is rectangular in cross-section, comprising a casing 20 having posts 19 at its four corners between which there are fixed louvers 10. Cooperating with the series of fixed louvers at each side of the casing is a set of movable louvers 11 which are adapted to be held in engagement with the fixed louvers 10 by a counterbalance 12 so that air arising in the stack will have free exit therefrom but which are capable of being moved by pressure of the wind to close the passages between them. Preferably these pivoted louvers 11 are carried upon suitable frames 13 which are removably secured in the casing 14 whereby all of the pivoted louvers at any one side of the casing may be readily removed by lifting the frame 13 up from said casing. Furthermore, in preparing the ventilator for shipment the several sets of louvers can be assembled in their respective frames, thereby facilitating setting up the ventilator on the building on which it is to be installed. In order that the pivoted louvers may turn readily on their axes the frames 13 are each provided with a series of bearings 15 for the shaft 16 of the pivoted louvers 11. These shafts of the pivoted louvers take a rolling line bearing in said bearings 15 and consequently there is very little frictional engagement with the result that very little pressure need be exerted by the wind to rock the pivoted louvers 11 on their axes.

By reason of the angular disposition of the fixed louvers 10, the wind entering between said louvers is directed against the pivoted louvers 11 in such wise as to insure their being rocked on their axes to their closed position. In addition, the pressure required to thus oscillate these louvers 11 and move them to their closed position may be varied or regulated by the counterbalances 12 which are adjustable toward and from the axial centers of said louvers. A convenient arrangement for adjusting said counterbalances is to have them threaded on pins 17 on the pivoted louvers.

It not infrequently occurs that rain, driven by the wind, will be caused to pass between the louvers 10 and gain access to the stack and for this reason the ventilator of the present invention is provided below the lowermost fixed louvers 10 with a trap for such rain water. This trap extends inwardly to a point below the pivoted louvers 11 whereby when the wind blows against the pivoted louvers 11 and closes them any water carried by the wind will hit against said closed louvers and drop down into said trap. Preferably this trap is in the nature of a trough formed by a flange 18 extending inwardly from the lowermost fixed louver 10 at each side of the casing so that the water is not only trapped but as said troughs are continuations of the louvers 10, such water, as it accumulates in said trap, will have access to the exterior of the casing, flowing outwardly and down along the lowermost fixed louver 10.

The frame 13 carrying the pivoted louvers 11 can, of course, take any desired form but they are preferably formed with mitered edges whereby the several frames will interlock and retain each other in an upright position in casing 20. It will be understood, though, that the casing may be other than rectangular in cross-section, and that the mitering of the side edges of said frames depends upon the cross-sectional contour of said casing. When installed the top of said casing is closed by a removable cover 21.

What I claim is:

1. In a ventilator, the combination of a fixed casing, a series of fixed louvers at each side of the casing forming air passages, a series of pivoted louvers arranged one above the other at each side of the casing in the interior thereof, the free edges of the pivoted louvers overlapping the fixed louvers whereby said fixed louvers will direct currents of air against the pivoted louvers, each pivoted louver being adapted to overlap the upper exterior portion of the next lower louver when in closed position.

2. In a ventilator, the combination of a fixed casing, a plurality of series of vertically arranged fixed louvers extending around the sides of the casing, and a series of pivoted louvers arranged one above the other cooperating with each of the series of fixed louvers, said fixed louvers overlapping the free edges of the pivoted louvers of the cooperating set of louvers to direct currents of air against said pivoted louvers, each pivoted louver being adapted to overlap the upper exterior portion of the next lower louver when in closed position.

3. In a ventilator, the combination of a fixed casing, a series of louvers at each side of the casing in the interior thereof, said louvers being arranged one above the other and pivoted adjacent their upper edges and a series of fixed louvers in each side of the casing forming air passages, said fixed louvers overlapping the free edges of the pivoted louvers to direct currents of air against said pivoted louvers to close the same, the lower free edge of each pivoted louver overlapping the upper exterior surface of the next lower louver when closed, and counterbalancing means for holding said pivoted louvers open, said fixed louvers also limiting the opening movement of the pivoted louvers.

4. In a ventilator, the combination of a fixed casing, a series of pivoted louvers at each side of the casing in the interior thereof, a series of fixed louvers at each side of the casing forming air passages for directing currents of air against the pivoted louvers, the lowermost louver of each series of fixed louvers being extended inwardly to a point below the pivoted louvers, said inwardly directed extension acting as trap to collect water passing between the louvers and directing such water to the exterior of the casing.

5. In a ventilator, the combination of a casing having a series of fixed louvers forming a multiplicity of air passages in each side thereof, a removable frame at each side of the casing, each frame having a plurality of bearings for the pivoted louvers, pivoted louvers having shafts journaled in said bearings, the shafts of said louvers having rolling line contacts in their respective bearings.

WALTER C. WILLIAMS.